Feb. 25, 1947.   J. H. JEFFREE   2,416,525
COLLECTIVE LENS SYSTEM
Filed Feb. 23, 1945
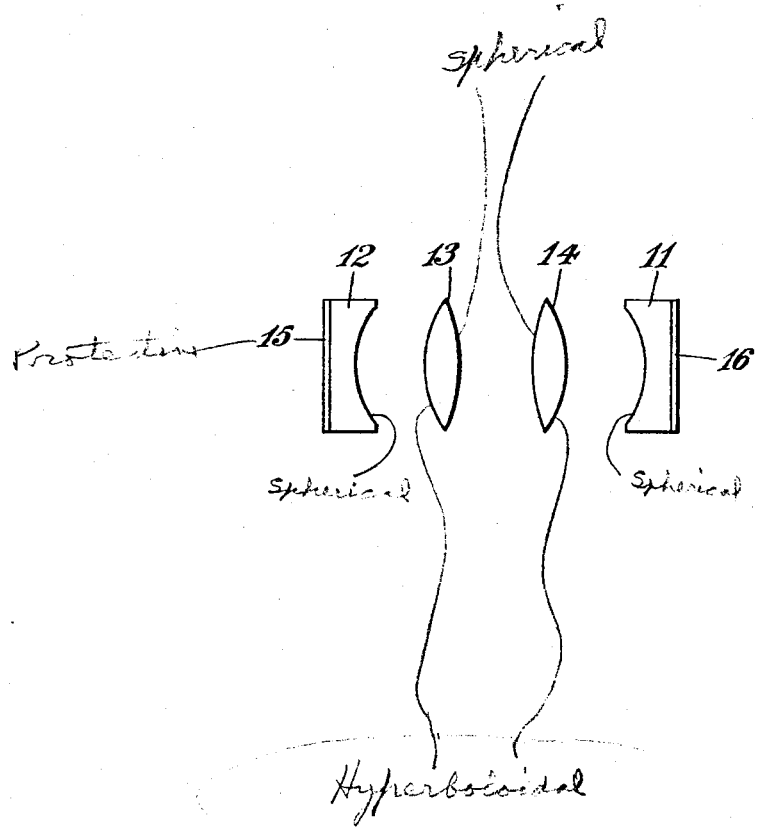
John H. Jeffree
Inventor
by his attorneys
Stebbins, Blenko & Webb Patented Feb. 25, 1947

2,416,525

UNITED STATES PATENT OFFICE 2,416,525

COLLECTIVE LENS SYSTEM

John Henry Jeffree, Cobham, England, assignor to Combined Optical Industries Limited, Slough, England, a British company Application February 23, 1945, Serial No. 579,391
In Great Britain November 22, 1943

1 Claim. (Cl. 88—57)

This invention relates to improvements in collective lens systems, and more particularly to improvements in anastigmatic lens systems, which may be, for example, intended for use as objectives for photographic or projection work. An object of the invention is the provision of means for correcting aberrations of various kinds in such systems, other objects comprising the provision of improved details of construction and combinations of elements, as will more fully appear hereinafter. The invention is applicable to lenses made of glass, but in its preferred form the lenses are made of transparent plastics.

Two known types of anastigmatic lens systems are efficient in some particulars, but less so in others. In one, a dispersive component or group of components is mounted with suitable spacings between two collective components or groups so that the whole forms a collective system. This arrangement facilitates correction of the Seidel aberrations, but is not always effective when aberrations of higher order, particularly those associated with wide angle of view, have to be taken into account.

The other system referred to employs the opposite arrangement, namely, a collective component or group mounted with suitable spacings between two collective components or groups, so that the whole system is collective. This arrangement is effective for the correction of aberrations associated with wide angle of view, but is less so for the correction of those associated with wide relative aperture.

The present invention overcomes the difficulties of the two types of systems referred to, by the provision of a system of the type last mentioned, in which a collective component or group is mounted between two dispersive components or groups. This system is corrected approximately for astigmatism and curvature of field, while at the same time other defects referred to above are overcome by providing the refractive surfaces of the collective component or component with curvatures, absolutely and relatively to each other, (referring to the opposite surfaces of one component), designed for this purpose. In particular, one or more refractive surfaces of the collective component or group are made aspherical, the direction of departure from sphericity towards the margin of such surfaces being such as to diminish the collective power of said component or group for marginal rays of light. The other refractive surfaces of the whole system may have any convenient forms which are suitable for the intended purpose.

Many detailed forms of the system covered by the invention are possible. For example, the outer dispersive components may each comprise a single lens, or a cemented unit giving relatively high chromatic dispersion, and the collective group may comprise one or two components or cemented units giving a lower chromatic dispersion.

When convenient, as may be especially the case in lenses made of plastic materials, the outer surfaces of the dispersive components may be plane, and plane glass cover plates may be cemented to these surfaces to protect them from abrasion. Any or all of the components of the system may be made of plastic materials, and the aspheric surfaces may be conveniently moulded with aspheric dies, or they may be ground by suitable devices.

In order that the invention may be more clearly understood, attention is directed to the accompanying drawing, which represents diagrammatically one lens system embodying the invention.

The system, as illustrated, comprises four simple separated components, the two outer components 11 and 12 which are dispersive, being identically similar plano-concave lenses of a polystyrene base plastic, and the two inner components 13 and 14 which are collective being bi-convex lenses of a methyl-methacrylate base plastic. The outer components 11 and 12 are arranged with their plane faces directed outwards and protective cover glasses 15 and 16 are cemented thereto as mentioned above. Their inner, concave faces are spherical.

The outwardly-directed surfaces of the two inner components 13, 14 are identical in form and approximately hyperboloidal, their inwardly-directed surfaces are spherical, and of shallower curvature than the central zones of the hyperboloidal surfaces. The system as a whole is approximately corrected for the Seidel aberrations and has approximately zero Petzval sum: It is also approximately corrected for chromatic aberrations. The variation of spherical aberration with wide angular field is reduced as far as possible by choice of the relative curvatures of the spherical and aspherical surfaces of the inner components, and some of the residual errors are offset approximately against small defects of Seidel curvature and Petzval sum, deliberately introduced. Such a system may have a corrected angular field of view well in excess of 90° with an aperture ratio of about f/5 or better.

As a specific example omitting the protective cover glasses 15 and 16 the following particulars may be given for the radii of the successive surfaces of the lenses 12, 13, 14, 11 for the axial distances between said surfaces and for the coefficients of refraction.

For an equivalent focal length 100 and reading from the end of the system directed to the distant conjugate focus (i. e. from the left-hand surface of lens 12 to the right-hand surface of lens 11).

|  | 12 | | 13 | | 14 | | 11 | |
|---|---|---|---|---|---|---|---|---|
| Radii | 00 | 31 | 37.7 (aspheric) | −100 | 100 | 37.7 (aspheric) | −31 | 00 |
| Axial separations | 5 | | 11.7 | 20 | 15 | 20 | 17.3 | 5 |
| ND | 1.59 | | 1.00 | 1.49 | 1.00 | 1.49 | 1.00 | 1.59 |

The radii given for the aspheric curves are those at the vertex of the hyperboloids. The two aspheric curves are similar. The asymptotes of the hyperboloids are inclined at 26.5° to the axis.

If desired, the described system may be modified, without altering the features described above, by embodying therein some of the features described in United States application Serial No. 525,634 to reduce or eliminate changes of focal length and other properties with temperature, for instance by including in the system components, or parts of cemented units, of glass or other selected media having appropriate temperature coefficients of refractive index and of linear expansion, wherever convenient.

I claim:

As a new article of manufacture, a collective lens system, comprising exterior dispersive components with a collective component mounted between the same and suitably spaced therefrom, the inwardly-directed surface of the latter being spherical and its outwardly-directed surface aspherical, the direction of departure from sphericity thereof towards the margin of such surface being such as to diminish the collective power of such component for marginal rays of light, said spherical surface being of shallower curvature than the central zone of said aspheric surface, to reduce the variation of spherical aberration of the system with wide angular field, the elements of the system being designed to correct it approximately for the Seidel aberrations and to give a nearly zero Petzval sum, small defects of Seidel curvature and Petzval sum being however left in the system to offset against small residual errors not removed by the choice of the relative curvatures of the spherical and aspherical surfaces of said inner component.

JOHN HENRY JEFFREE.

REFERENCES CITED

The following references are of record in the file of this patent:

UNITED STATES PATENTS

| Number | Name | Date |
|---|---|---|
| 934,579 | Straubel et al. | Sept. 21, 1909 |
| 2,100,290 | Lee | Nov. 23, 1937 |
| 2,140,979 | Bertele | Dec. 20, 1938 |
| 2,361,589 | Bennett et al. | Oct. 31, 1944 |
| 2,287,546 | Binda | June 23, 1942 |
| 2,085,437 | Michelssen | June 29, 1937 |
| 2,314,838 | Kingston | Mar. 23, 1943 |
| 1,980,483 | Hill | Nov. 13, 1934 |

FOREIGN PATENTS

| Number | Country | Date |
|---|---|---|
| 21,211 | British | 1901 |
| 329,350 | British | May 16, 1930 |
| 3,799 | British | 1912 |
| 490,381 | British | Aug. 15, 1938 |